United States Patent
Knibbe (10) Patent No.: US 10,509,239 B2
(45) Date of Patent: Dec. 17, 2019

(54) ACCESSORY MOUNT FOR GOGGLES

(71) Applicant: Symbiotic, LLC, Elsmere, KY (US)

(72) Inventor: Preston Charles Knibbe, Elsmere, KY (US)

(73) Assignee: Symbiotic, LLC, Elsmere, KY (US)

( * ) Notice: Subject to any disclaimer, the term of this patent is extended or adjusted under 35 U.S.C. 154(b) by 168 days.

(21) Appl. No.: 15/922,823

(22) Filed: Mar. 15, 2018

(65) Prior Publication Data

US 2018/0267335 A1    Sep. 20, 2018

Related U.S. Application Data (60) Provisional application No. 62/472,405, filed on Mar. 16, 2017.

(51) Int. Cl.
| | | |
|---|---|---|
| *F21V 21/00* | (2006.01) | |
| *G02C 11/00* | (2006.01) | |
| *B63C 11/12* | (2006.01) | |
| *A63B 33/00* | (2006.01) | |

(52) U.S. Cl.
CPC .............. *G02C 11/00* (2013.01); *B63C 11/12* (2013.01); *G02C 11/10* (2013.01); *A63B 33/002* (2013.01); *B63C 2011/123* (2013.01)

(58) Field of Classification Search
CPC ......... G02C 11/00; G02C 11/10; B63C 11/12; B63C 2011/123; A63B 33/002
USPC ....................................................... 362/396
See application file for complete search history.

(56) References Cited

U.S. PATENT DOCUMENTS

| | | |
|---|---|---|
| 4,907,582 A | 3/1990 | Meyerrose |
| 4,969,239 A * | 11/1990 | Bruno .................. A45F 5/02 24/13 |
| 5,183,326 A | 2/1993 | Case |
| 5,265,591 A | 11/1993 | Ferguson |
| 5,657,493 A | 8/1997 | Ferrero et al. |
| 5,940,891 A | 8/1999 | Lane |
| 6,999,732 B2 | 2/2006 | Fukuda et al. |
| 7,877,817 B1 | 2/2011 | Ho |
| 8,387,217 B1 | 3/2013 | Hinds et al. |
| 8,601,617 B1 | 12/2013 | Krnc |
| 8,689,366 B2 | 4/2014 | Ho |
| 9,655,783 B2 | 5/2017 | McNeal |
| 2004/0003809 A1 | 1/2004 | Pan |
| 2004/0079365 A1 | 4/2004 | Sato |
| 2005/0193478 A1 | 9/2005 | Hussey |
| 2006/0272635 A1 | 12/2006 | Shiue |
| 2007/0272237 A1 | 11/2007 | Shiue |

(Continued)

OTHER PUBLICATIONS

Accessory mount, published at https://www.thingiverse.com/thing:21764/#files.

*Primary Examiner* — Ali Alavi
(74) *Attorney, Agent, or Firm* — David A. Topmiller, Esq.

(57) ABSTRACT

An accessory mount for goggles is disclosed which may be attached to the strap or straps of goggles worn on the face of a person. The accessory mount may include a body and a mounting structure. The body may include one or two slits through which the strap or straps of the goggles may be inserted. The body may also include a facial section contoured to fit a person's face, and the facial section may have a cushion configured to rest against the face. The mounting structure may be configured so that different types of accessories, such as a camera or flashlight, may be removably affixed to the mounting structure.

20 Claims, 6 Drawing Sheets

(56) References Cited

U.S. PATENT DOCUMENTS

2008/0308107 A1    12/2008   Keith
2010/0083427 A1     4/2010   Schnurr
2012/0167277 A1     7/2012   Dunleavy et al.
2013/0091623 A1*   4/2013   McCulloch ............. A61F 9/025
                                                                                                      2/435

\* cited by examiner

ACCESSORY MOUNT FOR GOGGLES

CROSS REFERENCE TO RELATED APPLICATION

This application claims the benefit of provisional application Ser. No. 62/472,405, filed Mar. 16, 2017, the disclosure of which is incorporated herein by reference.

TECHNICAL FIELD

The present disclosure generally relates to accessory mounts for goggles, which may be attached to the strap or straps of goggles worn on the face of a person. The goggles may include dive masks, snorkel masks, or other headgear which may be worn underwater. The accessory mount allows the person to affix an accessory to it, such as a camera or a flashlight. The accessory mount may be easily attached to a variety of masks from different manufacturers, may be quite stable when moving about in water, and may be comfortable for the person to wear.

BACKGROUND

As background, there are a number of prior art apparatuses which allow a user to affix an accessory to goggles. Some of these apparatuses are designed to be attached to the straps of the goggles, while others are designed to be attached directly to the frame of the goggles themselves. However, none of the prior art apparatuses are designed to fit different types of goggles, to remain stable when moving about in the water, and to be comfortable for the user to wear. The accessory mounts described herein overcome all of these limitations.

As an example of the prior art, U.S. Pat. No. 5,183,326 discloses an apparatus for holding a flashlight or other small object adjacent to the head of an underwater diver. The apparatus can be attached, via two straps of its own, to the strap of a diving mask. The apparatus also has a specific gravity of less than one, which performs two functions. First, it provides buoyancy to the flashlight, which is heavier than water, so that the overall system is approximately weightless underwater. And second, it allows the system to float to the surface in case it falls off, or if the user wants to intentionally release it as a surface marker. However, this apparatus does not include slits into which the straps of the goggles may be easily inserted. Nor does it include a facial section having a cushion which is contoured to fit a person's face which provides additional stability and comfort for the user.

As another example of the prior art, U.S. Pat. No. 6,999,732 discloses a communication transceiver which may be mounted to the straps of a mask or a helmet. The device has two lateral slits through which the straps of the mask may be inserted in order to hold the device in place. The two straps for this mask must be separated so that one is above the ear and the other is below the ear. As such, the device is configured to rest behind the ear of the person. However, this device does not have a facial section or a cushion, nor is it is designed to accommodate different types of accessories. This device is only capable of having a communication transceiver which facilitates audible communication to and from the person wearing the device. Furthermore, the communication transceiver is intended to be in close contact with the person's head, thus reducing its level of comfort.

As yet another example of the prior art, U.S. Pat. No. 8,601,617 discloses a mounting device for attaching an accessory to a mask. The mounting device may be affixed directly to the mask; thus, the mask and the mounting device must have complementary mounting structures which allow the mounting device to be removably affixed to the mask. However, this mounting device may only be used with specific masks which have the requisite mounting structure; it cannot be used with masks from a variety of manufacturers. Also, the weight of the accessory is directly transmitted to the mask itself which may introduce a moment of inertia about the mounting point, possibly causing discomfort to the user and/or compromising the mask's seal. The aforementioned examples of prior art and their corresponding limitations are intended to be illustrative and not exhaustive.

The accessory mounts disclosed herein overcome the inherent disadvantages in each of the prior art apparatuses by providing numerous features which make the accessory mount adaptable to goggles from multiple manufacturers, to enhance the stability of the accessory mount with respect to the user's head, and to make the accessory mount very comfortable for the user. In one embodiment, the accessory mount may include a facial section which may be contoured to fit against the user's face. The facial section may include a cushion which rests against the person's face, thus providing a level of comfort as well as allowing the facial section to adapt to the unique features of an individual's face. The accessory mount may include one or more slits through which the one or more straps of the goggles may be inserted. The facial section may extend a minimum length above and below the center of the slits to improve stability. In addition, the height of the slits may be less than the height of the straps to further reduce the movement of the accessory mount. Furthermore, the accessory mount may include a mounting structure for an accessory, which may be disposed a certain distance below the center of the slits to further provide stability and comfort. Finally, if the accessory mount comprises two slits, the distance between the slits may be specified to further enhance stability. Limitations in the prior art will become apparent to those skilled in the art after reviewing the specification below and the corresponding drawings.

SUMMARY

In one embodiment, an accessory mount for attaching to goggles worn on the face is disclosed. The goggles comprise an inner strap and an outer strap, and the accessory mount comprises a body and a mounting structure. The body comprises a facial section, a cushion, an inner slit, and an outer slit, wherein: the inner slit is configured such that the inner strap of the goggles is capable of being inserted through the inner slit; the outer slit is configured such that the outer strap of the goggles is capable of being inserted through the outer slit; the facial section is contoured to fit the face; and the cushion is affixed to a surface of the facial section and is configured to rest against the face. And the mounting structure is mechanically coupled to the body and is configured such that an accessory is capable of being removably affixed to the mounting structure.

In another embodiment, an accessory mount for attaching to goggles worn on the face is disclosed. The goggles comprise a strap, and the accessory mount comprises a body and a mounting structure. The body comprises a facial section, a cushion, and a slit, wherein: the slit is configured such that the strap of the goggles is capable of being inserted through the slit; the facial section is contoured to fit the face; and the cushion is affixed to a surface of the facial section and is configured to rest against the face. And the mounting structure is mechanically coupled to the body and is configured such that an accessory is capable of being removably affixed to the mounting structure.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

The embodiments described herein generally relate to accessory mounts which may be attached to the strap or straps of goggles worn on the face of a person. The accessory mount may include a number of features which may allow it to be attached to a variety of goggles, to be stable when moving about underwater, and to be comfortable for the person to wear. As used herein, "goggles" is intended to include dive masks, snorkel masks, or other headgear which may be worn underwater. Also as used herein, "approximately" is intended to include values, for example, within 10% of the stated values.

Figure 1:
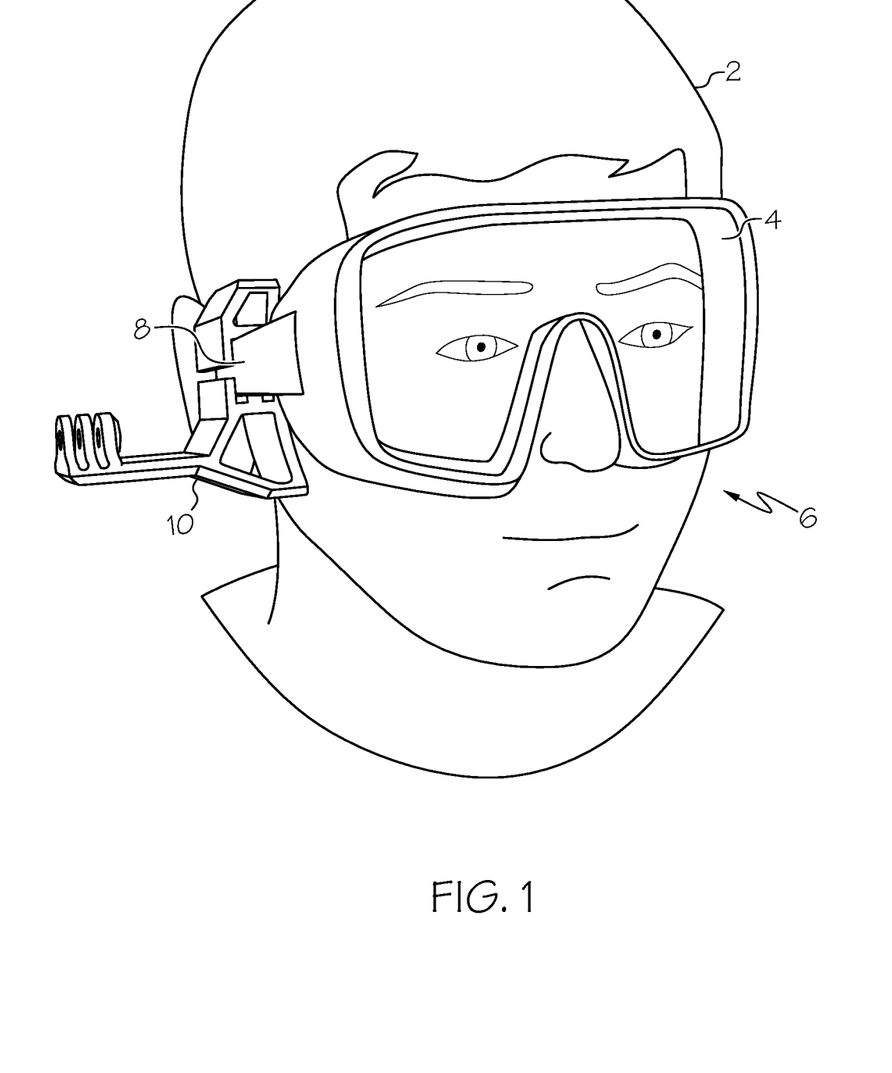
FIG. 1 depicts an accessory mount attached to goggles worn on the face of a person according to one or more embodiments shown and described herein.

FIG. 1 depicts an accessory mount 10 attached to the straps 8 of goggles 4 worn on the face 6 of a person. The straps 8 may wrap around the head 2 of the person and may be affixed to the other side of the goggles 4 so that the straps 8, when tightened, keep the goggles 4 snug against the person's face 6. Accordingly, the straps 8 may have an adjustment or cinching mechanism which allow the straps 8 to be tightened or loosened by the person. The accessory mount 10 may be configured to be attached to the straps 8 proximate to where the straps 8 are affixed to the goggles 4. The accessory mount 10 may also be configured to rest against the side of the person's face 6 between the eye and the ear. Furthermore, the accessory mount 10 may be symmetric such that it may be attached to the straps 8 on either side of the face 6.

Figure 2A:
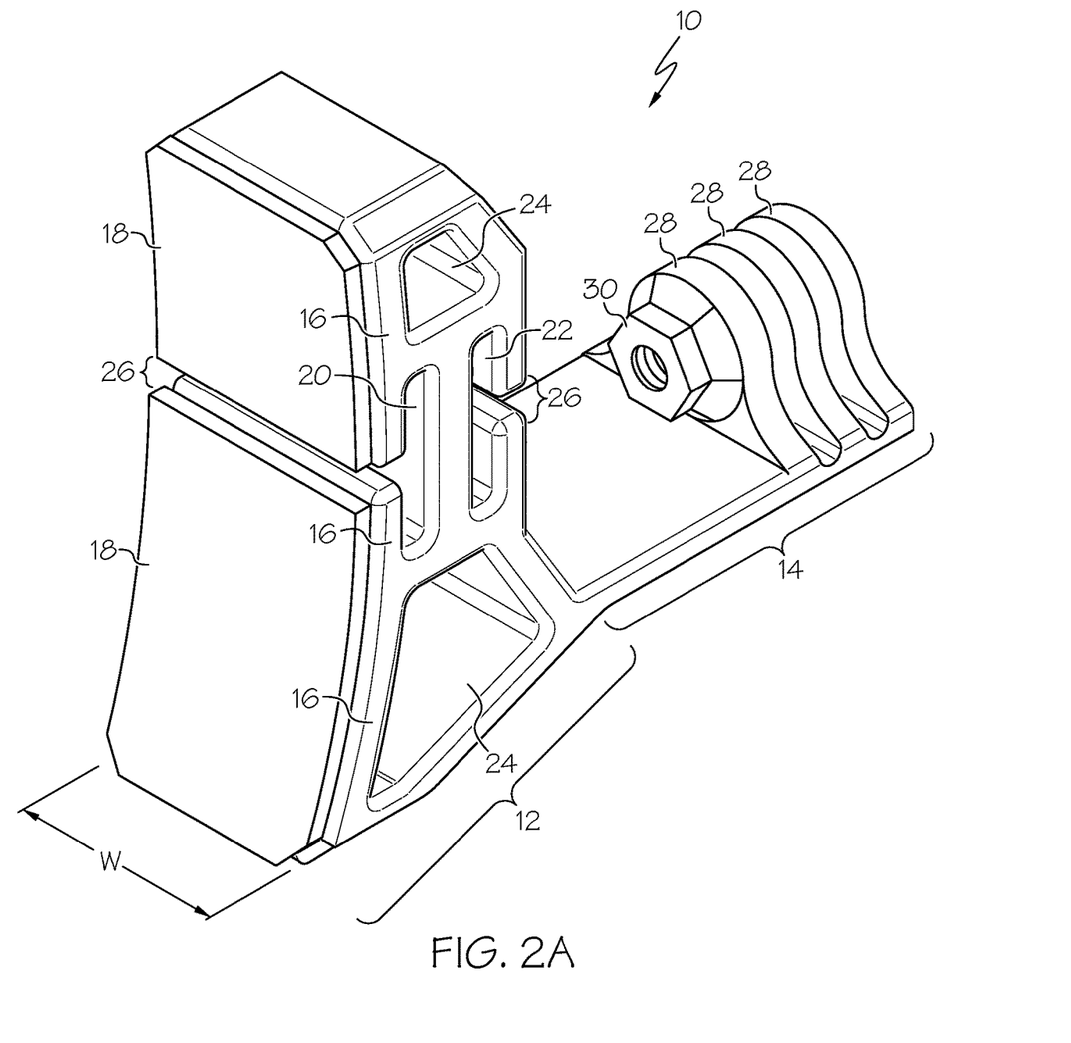
FIGS. 2A and 2B illustrate two isometric views of an accessory mount for goggles according to one or more embodiments shown and described herein.
Figure 2B:
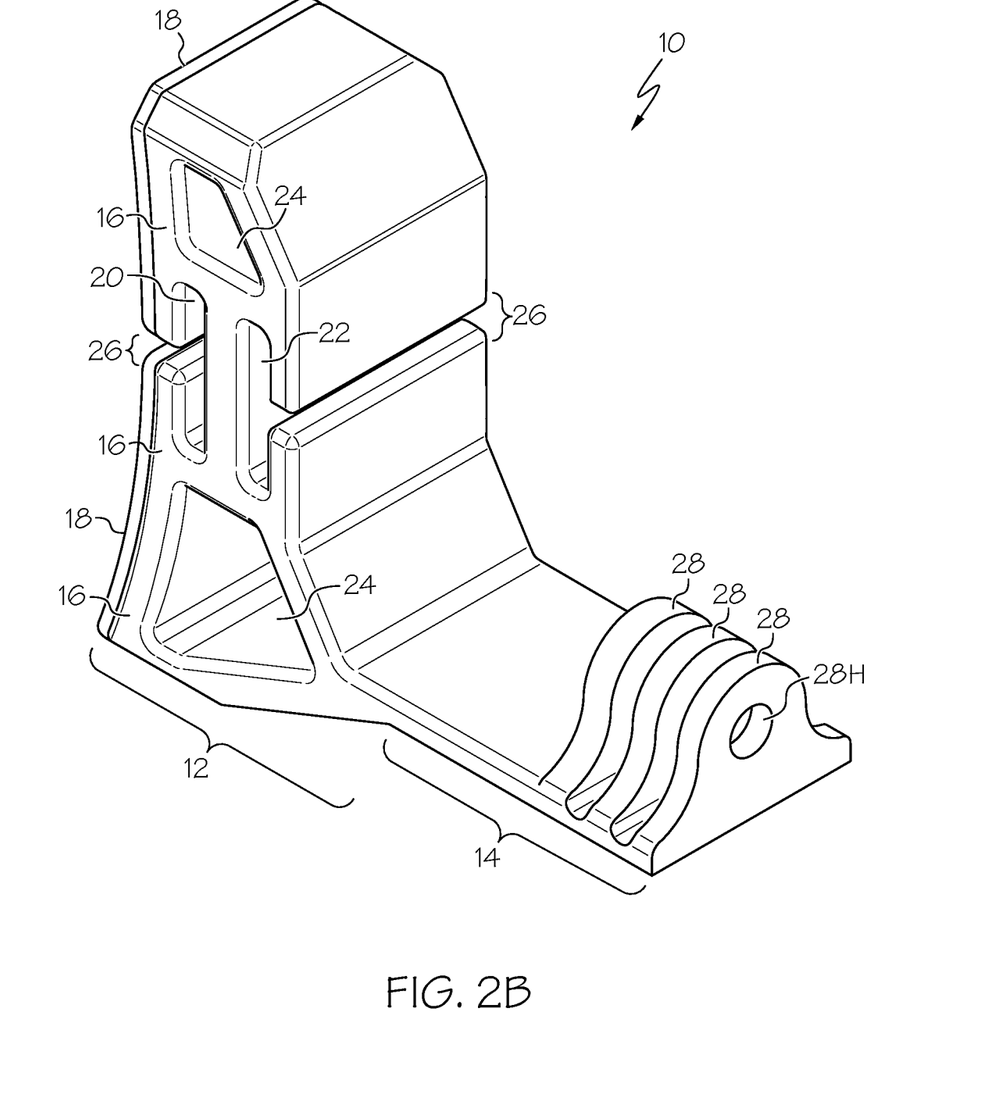

FIGS. 2A and 2B illustrate isometric views of an accessory mount 10 from two different perspectives according to one embodiment. The accessory mount 10 may include a body 12 and a mounting structure 14. The body 12 may include a facial section 16, a cushion 18, an inner slit 20, and an outer slit 22. The facial section 16 may be contoured so that it conforms to the shape of person's face between the eye and the ear, including above and below the cheekbone. As such it may have a generally concave shape. In one embodiment, the facial section 16 may have a curved shape; in other embodiments, the facial section 16 may be comprised of a series of linear sections which, when combined, have a generally concave shape. The facial section 16 may be contoured in any number of ways in order to conform to a person's face so as to provide a comfortable fit for the accessory mount 10.

The cushion 18 may be affixed to a surface of the facial section 16 so that the cushion 18 is disposed between the facial section 16 and the face of the person. As such, the cushion 18 rests against the face of the person. The cushion 18 may comprise a Neoprene® pad which, in one embodiment, is approximately 2 millimeters thick. The cushion 18 may have a surface that is configured to grip the face which may reduce the likelihood of the accessory mount 10 from moving laterally. Materials other than Neoprene® may be used as well, as is known in the art. The contoured shape of the facial section 16 combined with the softness of the cushion 18 may be very comfortable when the accessory mount 10 is attached to the straps of goggles worn by the person. The width W of the accessory mount 10 may be approximately 22 to approximately 34 millimeters for adults. The width W may be slightly less for children and adolescents. In one embodiment, W may be approximately 28 millimeters.

The inner slit 20 may be configured such that the inner strap of the goggles may be inserted through the inner slit 20. Likewise, the outer slit 22 may be configured such that the outer strap of the goggles may be inserted through the outer slit 22. When inserted into their respective slits of the body 12, the straps may apply a force to the body 12 which pushes the body 12 toward the face of the person. When this happens, the force exerted by the straps is transmitted to the facial section 16 and, ultimately, to the cushion 18, so that the accessory mount 10 is pushed against the person's face. As such, this force may be distributed over the surface area of the facial section 16 and, thus, the cushion 18.

The body 12 may also comprise one or more access slots 26 which may be mechanically coupled to the inner slit 20 and outer slit 22. The access slots 26 may provide a convenient mechanism for the straps to be inserted into and removed from the inner slit 20 and outer slit 22. As shown in FIGS. 2A and 2B, the access slots 26 are coupled to the inner slit 20 and outer slit 22 near the center of each respective slit. However, it is to be understood that the access slots 26 may be configured in numerous ways, as is known in the art. For example, access slots 26 may be coupled to the slits at the top or bottom of the slits. As another example, the access slots 26 may be configured to be only on the side of the body 12 which is furthest away from the face.

The body 12 may also have one or more voids 24 through which water may pass when the person, and hence the accessory mount 10, moves through the water. The voids 24 may reduce the fluid friction introduced by the accessory mount 10 and, therefore, may enhance the stability of the accessory mount 10. The voids 24 may be simply portions of the body 12 in which material is removed to create an empty space. As shown in FIGS. 2A and 2B, the voids 24 may typically pass through the entire width of the body 12 and may be disposed both above and below the inner slit 20 and the outer slit 22 as well as other locations.

The mounting structure 14 may be configured so that an accessory may be removably affixed to it. As such, the mounting structure 14 may comprise one or more mounting brackets 28 which are capable of engaging complementary brackets of an accessory. The mounting structure 14 may also comprise a nut 30 to which a mounting screw may be affixed. The mounting structure 14 may be mechanically coupled to the body 12 below the inner slit 20 and the outer slit 22. The mounting structure 14 may be disposed at a substantially right angle with respect to the person's face. In this fashion, the mounting structure 14 may be substantially parallel to the ground when the person's head is oriented in an up and down position. Thus, an accessory, such as a camera, may have nearly the same perspective as the person's eyes when moving around in the water.

As shown in FIGS. 2A and 2B, the accessory mount 10 may have beveled edges to enhance its appearance, to reduce weight, and/or to reduce fluid friction. However, it is not essential for the edges to be beveled, and embodiments may or may not have any or all of the edges beveled. Except for the cushion 18 (discussed above), the rest of the accessory mount 10 may be constructed of plastic, metal, a metal alloy, or any other suitable material or combination of materials. In one embodiment, the accessory mount 10 may be constructed of polycarbonate plastic. In another embodiment, the accessory mount 10 may be constructed of stainless steel. The cushion 18 may typically be constructed of a different material than the rest of the body 12. As discussed above, the cushion 18 may be constructed of Neoprene® which may be approximately 2 millimeters thick.

Figure 3:
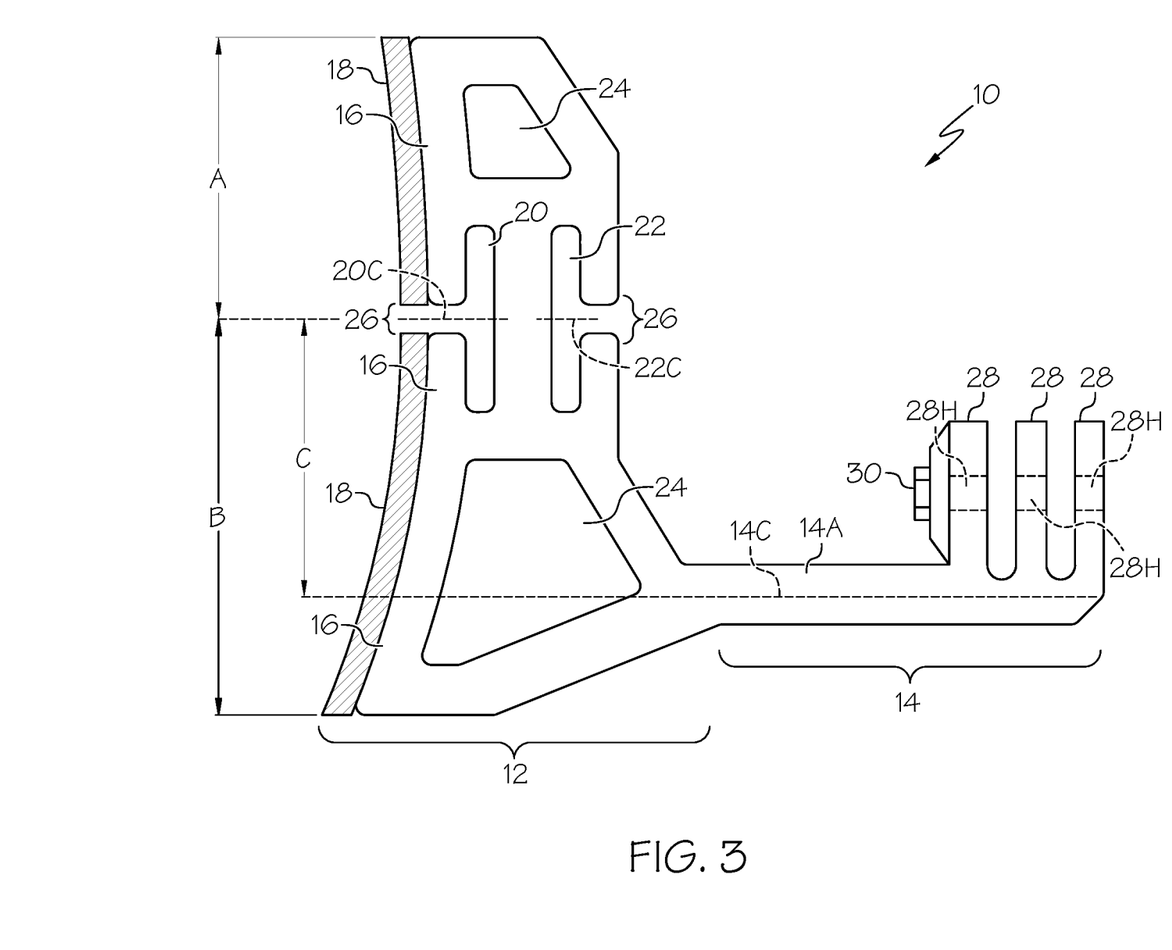
FIG. 3 shows a side view of an accessory mount according to one or more embodiments shown and described herein.

FIG. 3 depicts a side view of the accessory mount 10 according to one embodiment. In this figure, the edges of the accessory mount 10 are not shown as being beveled for clarity. The accessory mount 10 may comprise a body 12 and a mounting structure 14. As discussed above, the body 12 may comprise a facial section 16, a cushion 18, an inner slit 20 and an outer slit 22. Furthermore, the body 12 may comprise one or more voids 24 and well as one or more access slots 26. The cushion 18 may have a gap in order to accommodate the access slot 26. The vertical center 20C of the inner slit 20 may be in substantial alignment with the vertical center 22C of the outer slit 22. Furthermore, the inner slit 20 and outer slit 22 may be substantially parallel as shown in FIG. 3. In one embodiment, the body 12 may only comprise a single slit, which may be disposed in the body 12 in a similar location as the inner slit 20 or outer slit 22.

In order to provide more stability and comfort to the person, the facial section 16 may extend above the center 20C of the inner slit 20 (and the center 22C of the outer slit 22) by a distance A. Likewise, the facial section 16 may extend below the center 20C of the inner slit 20 (and the center 22C of the outer slit 22) by a distance B. In one embodiment, A may be approximately 20 to 35 approximately millimeters, and B may be approximately 35 to approximately 50 millimeters. In one embodiment, A may be approximately 29.5 millimeters, and B may be approximately 41.5 millimeters. Since the straps of the goggles may provide a force that holds the accessory mount 10 against the face, the accessory mount 10 may try to rotate clockwise and/or counterclockwise about the straps when the person moves around in the water. Thus, specifying a range for A and B may provide leverage to keep the accessory mount 10 stable.

Similarly, specifying the location of the mounting structure 14 with respect to the center 20C of the inner slit 20 may also provide an additional measure of stability. The mounting structure 14 may comprise an extension arm 14A which may extend horizontally away from the person's face. The extension arm 14A may have an axis 14C which is substantially parallel to and substantially in the center of the extension arm 14A. The axis 14C of the extension arm 14A may be disposed at a distance C from the center 20C of the inner slit 20 (and the center 22C of the outer slit 22). The distance C may be approximately 18 to approximately 38 millimeters. In one embodiment, the distance C may be approximately 29 millimeters, which may provide a center of gravity and/or weight distribution for the accessory mount 10 which enhances stability. If the mounting structure 14 was disposed closer to the bottom of the body 12, the weight of the accessory may cause the accessory mount 10 to pivot downwards, creating a lever action that may overcome the retaining force of the straps. This may cause the top portion of the accessory mount 10 to be pulled away from the face during use, thus reducing stability.

Likewise, if the mounting structure 14 was placed directly below the slits 20, 22, not enough weight from the accessory may be distributed to the bottom section and a more direct outward force may be exerted on the straps causing the same effect of the top portion pulling away from the face, as well as making it more likely that the bottom portion would pull away from the face if the head was moved rapidly. Essentially, putting the mounting structure 14 between the bottom of the accessory mount 10 and the bottom of the slits 20, 22 may distribute just enough of the weight of the accessory to the lower portion of the mount without causing too much outward force on the straps to create instability on the upper portion.

The mounting structure 14 may further comprise one or more mounting brackets 28 to which complementary mounting brackets of an accessory may be affixed. The mounting brackets 28 may have a hole 28H through which a mounting screw may be inserted. One of the mounting brackets 28 may have a nut 30 to which the mounting screw may be affixed when the accessory is affixed to the mounting structure 14. Although vertical mounting brackets 28 are shown in FIG. 3, it is to be understood that other types of mechanisms may be used to affix the accessory to the mounting structure 14, as is known in the art.

Figure 4:
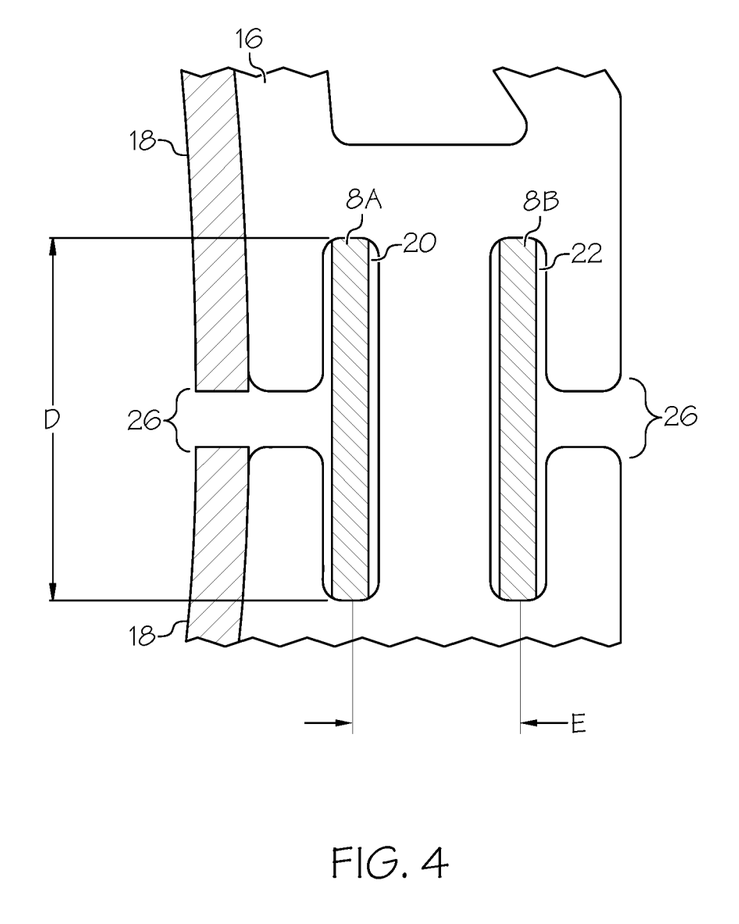
FIG. 4 illustrates straps of the goggles inserted into slits of the accessory mount according to one or more embodiments shown and described herein.

FIG. 4 illustrates the straps of goggles inserted into the inner slit 20 and outer slit 22 of the accessory mount. The goggles (not shown) may comprise an inner strap 8A and an outer strap 8B. Although these are referred to as separate straps 8A, 8B, it is to be understood that the inner strap 8A and the outer strap 8B may comprise the same physical strap which is simply looped onto the end of the goggles. The inner strap 8A may be inserted into the inner slit 20, and the outer strap 8B may be inserted into the outer slit 22 as shown. The straps 8A, 8B of the goggles typically have a height that is much larger than their width. The straps 8A, 8B, when worn on the face, are pulled tight (or cinched) in order to secure the goggles to the face. As such, making the height of the straps 8A, 8B relatively large tends to spread out the force that the straps 8A, 8B exert against the head of the user. The inner slit 20 and outer slit 22 may be elongated in a similar fashion so that the straps 8A, 8B fit easily within the two slits 20, 22. In one embodiment, the height D of the slits 20, 22 may be less than the height of the straps 8A, 8B which may prevent the straps 8A, 8B from moving up and down within the slits 20, 22 when the user moves around in water.

Furthermore, the distance E between the inner slit 20 and the outer slit 22 may be specified to further enhance the stability of the accessory mount. The distance E may be approximately 5 to approximately 13 millimeters. In one embodiment, the distance E may be approximately 9 millimeters. Specifying that the distance E is within the aforementioned range may not only improve stability but may also to prevent the top portion from breaking off from the bottom at this point. If distance E is too small, it may become vulnerable. Increasing distance E may improve the stability of the accessory mount since the straps, when cinched tightly, may have more to "grab" on. However, increasing distance E too much may cause the body to impose on the space available for the accessory. Specifying that distance E is approximately 5 to approximately 13 millimeters may be a good compromise for improving stability but not robbing space for the accessory.

Figure 5A:
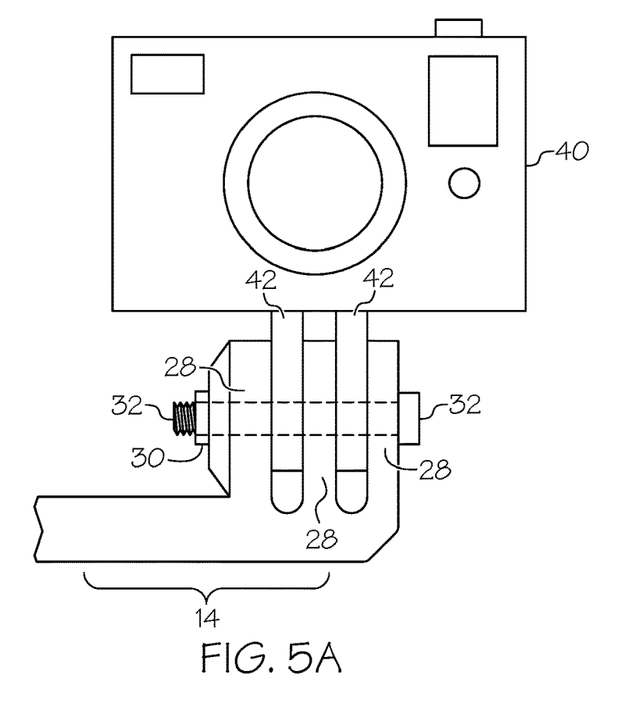
FIGS. 5A and 5B depict accessories mounted to an accessory mount according to one or more embodiments shown and described herein.
Figure 5B:
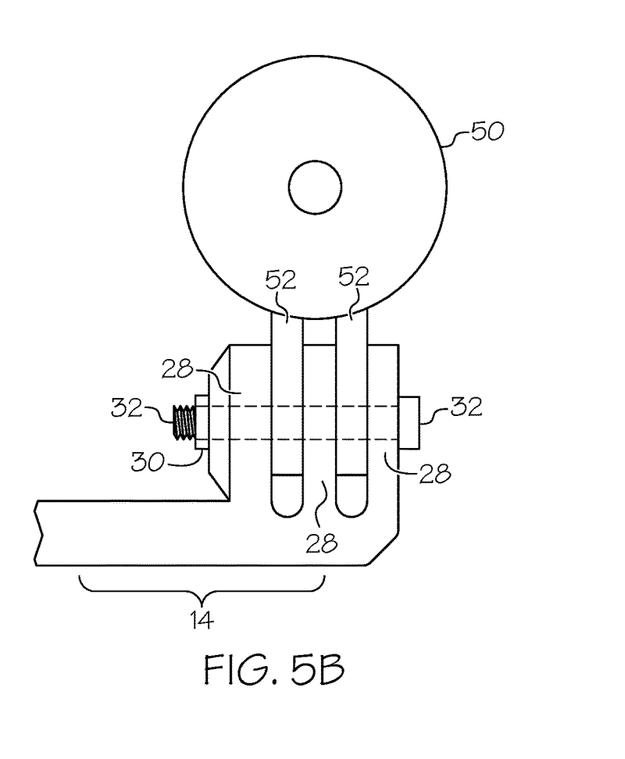

FIGS. 5A and 5B depict two examples of accessories which may be affixed to the mounting structure 14 of the accessory mount. These examples are illustrative in nature, and it is to be understood that other types of accessories may be used as well. FIG. 5A shows a camera 40 affixed to the mounting structure 14. The camera 40 may have two camera mounting brackets 42 which are configured to engage with the mounting brackets 28 of the mounting structure 14. The leftmost mounting bracket 28 may include a nut 30 to which a mounting screw 32 is capable of being threaded (and tightened), thereby affixing the camera 40 to the mounting structure 14. When the camera 40 is affixed to the mounting structure 14, the camera mounting brackets 42 may be engaged with the mounting brackets 28 of the mounting structure 14 so that holes in the bracket align. A mounting screw 32 may then be inserted through all the brackets 28, 42 and threaded into and tightened to the nut 30. In this fashion, the camera 40 may be easily affixed to the mounting structure 14. In a similar manner, the camera 40 may be removed from the mounting structure 14 by reversing the previous steps. Using brackets to affix the camera 40 to the mounting structure 14 is only one technique. Other techniques and structures which may be used to removably affix the camera 40 to the mounting structure 14, as is known in the art.

Likewise, FIG. 5B illustrates a flashlight 50 affixed to the mounting structure 14. The flashlight 50 may have two flashlight mounting brackets 52 which are configured to engage with the mounting brackets 28 of the mounting structure 14. The leftmost mounting bracket 28 may include a nut 30 to which a mounting screw 32 is capable of being threaded (and tightened), thereby affixing the flashlight 50 to the mounting structure 14. When the flashlight 50 is affixed to the mounting structure 14, the flashlight mounting brackets 52 may be engaged with the mounting brackets 28 of the mounting structure 14 so that holes in the brackets align. A mounting screw 32 may then be inserted through all the brackets 28, 52 and threaded into and tightened to the nut 30. In this fashion, the flashlight 50 may be easily affixed to and removed from the mounting structure 14. As discussed above, using mounting brackets 28 to affix the flashlight 50 to the mounting structure 14 is only one technique. Other techniques and structures which may be used to removably affix the flashlight 50 to the mounting structure 14, as is known in the art.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. An accessory mount for attaching to goggles worn on the face, the goggles comprising an inner strap and an outer strap, and the accessory mount comprising a body and a mounting structure, wherein:
    the body comprises a facial section, a cushion, an inner slit, and an outer slit, wherein:
        the inner slit is configured such that the inner strap of the goggles is capable of being inserted through the inner slit;
        the outer slit is configured such that the outer strap of the goggles is capable of being inserted through the outer slit;
        the facial section is contoured to fit the face; and
        the cushion is affixed to a surface of the facial section and is configured to rest against the face; and
    the mounting structure mechanically coupled to the body and is configured such that an accessory is capable of being removably affixed to the mounting structure.

2. The accessory mount of claim 1, wherein the facial section extends at least approximately 20 millimeters above the center of the inner slit, and the facial section extends at least approximately 35 millimeters below the center of the inner slit.

3. The accessory mount of claim 2, wherein the mounting structure comprises an extension arm mechanically coupled to the body, and an axis of the extension arm is disposed between approximately 18 millimeters and approximately 38 millimeters below the center the inner slit.

4. The accessory mount of claim 3, wherein the outer slit is disposed between approximately 5 millimeters and approximately 13 millimeters away from the inner slit.

5. The accessory mount of claim 4, wherein the body further comprises one or more voids through which water is capable of passing when the accessory mount is moving though water.

6. The accessory mount of claim 5, wherein a height of the inner slit is less than a height of the inner strap, and a height of the outer slit is less than a height of the outer strap.

7. The accessory mount of claim 1, wherein the mounting structure comprises an extension arm mechanically coupled to the body, and an axis of the extension arm is disposed between approximately 18 millimeters and approximately 38 millimeters below the center the inner slit.

8. The accessory mount of claim 7, wherein the outer slit is disposed between approximately 5 millimeters and approximately 13 millimeters away from the inner slit.

9. The accessory mount of claim 8, wherein the body further comprises one or more voids through which water is capable of passing when the accessory mount is moving though water.

10. The accessory mount of claim 9, wherein a height of the inner slit is less than a height of the inner strap, and a height of the outer slit is less than a height of the outer strap.

11. The accessory mount of claim 1, wherein the outer slit is disposed between approximately 5 millimeters and approximately 13 millimeters away from the inner slit.

12. The accessory mount of claim 11, wherein the body further comprises one or more voids through which water is capable of passing when the accessory mount is moving though water.

13. The accessory mount of claim 12, wherein a height of the inner slit is less than a height of the inner strap, and a height of the outer slit is less than a height of the outer strap.

14. The accessory mount of claim 1, wherein the body further comprises one or more voids through which water is capable of passing when the accessory mount is moving though water.

15. The accessory mount of claim 1, wherein a height of the inner slit is less than a height of the inner strap, and a height of the outer slit is less than a height of the outer strap.

16. The accessory mount of claim 1, wherein the mounting structure comprises an extension arm mechanically coupled to the body such that an axis of the extension is substantially at a right angle to the face.

17. The accessory mount of claim 1, wherein the body further comprises an inner access slot and an outer access slot, wherein:
 the inner access slot is mechanically coupled to the inner slit, such that the inner strap is capable of being inserted into the inner slit through the inner access slot; and
 and the outer access slot is mechanically coupled to the outer slit, such that the outer strap is capable of being inserted into the outer slit through the outer access slot.

18. The accessory mount of claim 1, wherein the accessory includes a camera or a flashlight.

19. An accessory mount for attaching to goggles worn on the face, the goggles comprising a strap, and the accessory mount comprising a body and a mounting structure, wherein:
 the body comprises a facial section, a cushion, and a slit, wherein:
  the slit is configured such that the strap of the goggles is capable of being inserted through the slit;
  the facial section is contoured to fit the face; and
  the cushion is affixed to a surface of the facial section and is configured to rest against the face; and
 the mounting structure mechanically coupled to the body and is configured such that an accessory is capable of being removably affixed to the mounting structure.

20. The accessory mount of claim 19, wherein:
 the facial section extends at least approximately 20 millimeters above the center of the slit;
 the facial section extends at least approximately 35 millimeters below the center of the slit;
 the mounting structure comprises an extension arm mechanically coupled to the body, and an axis of the extension arm is disposed between approximately 18 millimeters and approximately 38 millimeters below the center the slit; and
 a height of the slit is less than a height of the strap.

* * * * *